(12) United States Patent
Neumüller

(10) Patent No.: US 7,259,269 B2
(45) Date of Patent: Aug. 21, 2007

(54) METHOD FOR OBTAINING AN OIL FRACTION AND A PROTEIN FRACTION FROM A VEGETABLE STARTING SUBSTANCE

(76) Inventor: Waldemar Neumüller, Wilheim-Baum-Weg 29, D-37077 Göttingen (DE)

( * ) Notice: Subject to any disclaimer, the term of this patent is extended or adjusted under 35 U.S.C. 154(b) by 0 days.

(21) Appl. No.: 11/070,812

(22) Filed: Mar. 2, 2005

(65) Prior Publication Data

US 2006/0199969 A1   Sep. 7, 2006

(51) Int. Cl.
 *C07C 1/00* (2006.01)
(52) U.S. Cl. .............................. 554/12; 554/8
(58) Field of Classification Search ............... 554/8, 554/12
 See application file for complete search history.

(56) References Cited

U.S. PATENT DOCUMENTS

| | | | |
|---|---|---|---|
| 3,408,374 A | 10/1968 | Cavanagh et al. | 260/412.4 |
| 4,089,848 A | 5/1978 | Bell et al. | 260/112 |
| 4,190,577 A | 2/1980 | Steele et al. | 260/123.5 |
| 6,265,593 B1 | 7/2001 | Best et al. | 554/12 |
| 6,335,044 B1 | 1/2002 | Wasche et al. | 426/430 |
| 2001/0014750 A1 | 8/2001 | Ulrich et al. | 554/14 |
| 2001/0056181 A1 | 12/2001 | Muir et al. | 536/4.1 |

FOREIGN PATENT DOCUMENTS

| | | | |
|---|---|---|---|
| GB | 654002 | * | 5/1951 |
| GB | 900126 | | 7/1962 |
| GB | 901110 | | 7/1962 |

* cited by examiner

*Primary Examiner*—Deborah D. Carr
(74) *Attorney, Agent, or Firm*—Thomas, Kayden, Horstemeyer & Risley, LLP

(57) ABSTRACT

A method for obtaining an oil fraction and a protein fraction from a vegetable starting substance comprises the steps of: extracting the starting substance which has been reduced in size with alcohol, and separating an alcohol liquid phase from the extracted starting substance; processing the alcohol liquid phase to obtain the oil fraction; avoiding drying of the alcohol wet extracted starting substance directly after the alcohol-extraction; transferring the still alcohol wet extracted starting substance into an aqueous suspension to reduce the alcohol content of the extracted starting substance below 5%; and processing the aqueous suspension to obtain the protein fraction.

18 Claims, No Drawings

METHOD FOR OBTAINING AN OIL FRACTION AND A PROTEIN FRACTION FROM A VEGETABLE STARTING SUBSTANCE

The invention relates to a method for obtaining an oil fraction and a protein fraction from a vegetable starting substance. To this end, the starting substance which has been reduced in size in at least one dimension is extracted to obtain the oil fraction. Afterwards, the extracted starting substance is processed to obtain the protein fraction.

PRIOR ART

The increasingly growing demand for renewable starting materials, for example, for obtaining vegetable oil, starch, phytoestrogenes, vitamins, natural dyes, proteins and fibers has resulted into a change of thinking with regard to the processing of vegetable starting substances which contain these valuables. More and more it is cared for that the valuables included in the starting substances are obtained without remainders and completely. At the same time it is cared for a high purity and a freedom of noxious contaminations.

The method presently employed for processing vegetable raw materials containing oil and proteins are various and range from aqueous extracts over alcohol-extraction to huge plants for the extraction of vegetable oils with hexane. As a rule, only one valuable substance which is obtained from the respective vegetable starting substance is in the focus of the processing up to now. As a result, huge amounts of unusable remainders of the vegetable starting substance are often produced in obtaining the respective valuables, which in the best case are disposed as animal food, although principally a big potential of valuables may still be seen here.

One exception is constituted by obtaining vegetable oil with the aid of the solvent hexane. In this known method which works similar to a Soxhlet-extraction the remainder from the extraction is partially processed so that at least one further raw material is obtained from it. A typical example is the production of soy oil. Here, the remainders of the hexane extraction, i.e. the extracted chips are either gentle dried, i.e. dried from solvent into so-called "white flakes", or less gently into so-called "toasted flakes". During this drying the solvent which is still present in the hexane wetted extracted starting substance after extraction is removed either by steam or by heating. The white flakes may then be processed into soy flour, soy concentrates or soy isolates. In principle, processing of toasted flakes is also possible; because of the high level of denaturation of the protein, however, toasted flakes are mainly used as animal food.

Besides their direct use in the food industry, white flakes may also be used as starting substances for a further extraction. The alcohol-extraction of white flakes for obtaining phytoestrogenes (isoflavones) is known. The hexane and alcohol-extracted remainders remaining here are disposed as animal food, because the still contained fibers and proteins are denatured to such an extent that functional properties of these ingredients are no longer existing. The functional properties are a pre-condition for the use of fibers and proteins in the field of food stuff.

Very large amounts of renewable raw materials are processed in the production of vegetable oil. Although the methods which are employed today are perfected, there still exists a certain disadvantage in that only big units may be operated in an economic way. Thus, the smallest just economically working plant for the production of soy oil by hexane extraction processes 120 metric tons per day. Plants having a capacity of several thousand metric tons per day are even more efficient, and are used in practice. Such a processing capacity, however, is only usable, if the obtained raw materials can be delivered into an international market. This, however, is not realistic particularly with regard to new products and for those offering a product for the first time.

In this context the present invention deals with the problem to provide a method of the type described at the beginning which is applicable at an industrial scale but which is also applicable for smaller plants having a capacity of 120 metric tons starting substance per day and less.

Although the solvent hexane is not undisputed, other suitable extraction agents, like, for example, alcohols are presently not used in industry. The technique might correspond to the hexane extraction, in this extraction, however, the alcohol would even stronger denature the proteins and fibers contained in the starting substance than hexane. Thus, a further use and processing of the extracted starting substances would be strongly limited, which would negatively influence the economic efficiency.

However it is known to use alcohol afterwards or in certain methods even during the hexane extraction as an additional extraction solvent. Thus, in the production of soy concentrates an alcohol-water-mixture is used to wash away flatulence producing soluble sugars out of white flakes. The alcohol concentrations employed here are, however, generally too low to also extract oils and lipids quantitatively, for which reason this method step follows the oil extraction by hexane. Further, proteins in the white flakes are denatured by the alcohol-extraction as expected, which results in a lower functionality of the protein concentrate treated in this way as compared to flours or isolates which are obtained without such a washing step.

The use of isopropanol together with hexane and super-critical carbon dioxide is known from US 2001 00 14 750 A. Here, corn is extracted with this solvent mixture for producing oil. In the same way as it is common in soy extraction with pure hexane, the starting substance are rolled into thin flakes which are then guided in a counter current with regard to the solvent. Rolling the starting substance into the flakes corresponds to a reduction in size of the starting substance in one dimension, i.e. the thickness of the flakes.

From U.S. Pat. No. 6,265,593 it is known to use alcohol and hexane simultaneously for the extraction of oil from a vegetable starting substance. It is supposed to be the special point here that processing takes place in an aqueous system, whereas classical hexane extraction methods purposefully omit the use of water. However, it has to be seen that a separation of the two organic solvents hexane and alcohol results in higher cost than processing of a pure solvent in separating the vegetable oil from the extraction solution. Because of the use of hexane even the remainder of the extraction, i.e. the extracted starting substance has to be made free of solvent, which definitively requires a special process of removing the solvent. With regard to the water portion in the extraction, this process is laborious and consumes a lot of energy.

A method known from US 2001 00 56 181 A operates with several alcohol-extraction steps within a range of the alcohol concentration from 40 to 80%. From extraction stage to extraction stage the alcohol concentration increases. This method will not be applicable to a big scale application because of its extraction time of several hours.

TASK OF THE INVENTION

It is the task of the invention to provide a method of the type described at the beginning in which—besides an industrial applicability even in plants of medium size (see above)—both a high value oil fraction and a high value protein fraction with good functional properties of the proteins are obtained.

DESCRIPTION OF THE INVENTION

In the method according to the invention which works with alcohol for extracting oils out of the vegetable starting substance, a too far reaching denaturation of proteins and also of fibers in the extracted starting substance can surprisingly be avoided in that drying of the alcohol wet extracted starting substance directly after the alcohol-extraction is avoided. Transferring the still alcohol wet extracted starting substance into an aqueous suspension, the alcohol content of the extracted starting substance being reduced below 5%, removes the highest denaturating potential of the alcohol which the alcohol indeed does not exhibit during the actual extraction but during drying the extracted starting substance. When the extracted starting substance is reduced in its alcohol content, it can be further processed in various ways.

To further delimit the denaturation by the alcohol which is used for extracting the oils in the new method, the starting substance is reduced in size to flour having particle sizes in the range of 10 to 260 µm, preferably from 50 to 150 µm. In flour having these particle sizes the relative surface over which the extraction of the oil takes place, is clearly higher than in case of the flakes, which are usually extracted by hexane. As a result the extraction time in the new method can be shortened. This automatically means a further reduction with regard to the denaturing potential of the alcohol. It is to be understood that flour with particle sizes in the said range requires other processing techniques during extraction as compared to the much bigger flakes. The separation techniques applicable at an industrial scale thus set a lower limit for the suitable particle size of the flour. The flour has still to be separatable from the extracting alcohol and the oils extracted with the alcohol. This can be affected, for example, by means of industrial centrifuges or filter presses.

A preferred alcohol for the alcohol-extraction of the starting substance is isopropanol. This alcohol may be economically used and is generally not connected with the same reservations in the field of foodstuffs as hexane.

A further possibility of influencing the denaturing potential of the alcohol is the march of temperatures during the extraction. With increasing temperature the denaturing potential of the alcohol increases. On the other hand, the extraction property of the alcohol also increases with increasing temperature. A temperature range from 40 to 70° C. for the alcohol-extraction results as a compromise between these two aspects. Particularly preferred is a temperature range from 50 to 60° C., i.e. of about 55° C.

At last, it is also decisive how high the alcohol concentration is during the extraction. The alcohol concentration must be at least 60% to obtain a good oil yield. Preferably, it is clearly above 80%. Even at an industrial scale an alcohol concentration of over 85% in the alcohol-extraction is both realistic and preferred.

To totally remove the denaturing potential of the alcohol by means of exchanging it by water, the extracted starting substance should be washed with water until its alcohol content is lower than 2%, preferably it is reduced below 1%.

In washing the extracted starting substance its comparatively small particle sizes are also an advantage, because comparatively large exchange surfaces are thus provided. During reducing the alcohol content of the extracted starting substance with water, the pH-value of the aqueous suspension should be between 4 and 5, i.e. in the area of the isoelectric point of the proteins contained in the starting substance. Thus it is avoided that the proteins unintended become dissolved at this point.

Denaturations caused by the alcohol which still occur in the method according to the invention may at least be essentially removed by an alkaline treatment. The starting substance which has been already reduced in its alcohol content is subjected to this alkaline treatment. To this end, pH-values in the range of 9 to 10 are particularly suited. To support the alkaline treatment, a homogenization of the starting substance is suited, for example, by means of high pressure disintegration.

Heating up the alcohol for the extraction can be done by means of a heat exchanger which takes the required heat at another point of the method for cooling the method products. In heating up the starting substance it has to be cared for that no heat denaturing of the obtained proteins takes place which binds these proteins to the fiber matrix of the starting substance.

Because of the small particle size extraction times of less than 60 min., actually even of less than 30 min., i.e. of about 15 min., may be achieved. At the end of the extraction the alcohol suspension is separated into the alcohol liquid phase and the extracted starting substance. This is preferably accomplished by means of a chamber filter press, which allows further washing of the remainder even within the filtration. Depending on the extraction result, the alcohol-extraction can also completely be repeated. As a rule, a one step extraction with further washing or a two step extraction are sufficient. If centrifugation is applied as a separation technique, suitably multiple centrifuges are arranged in series in a form of a so called decanter.

The extracted ingredients, i.e. particularly the oils, may be isolated in that the alcohol is distilled off, for example, via a thin layer evaporator. It can then be fed back to the extraction again. The concentrate resulting after distilling the alcohol off can be refined according to known methods, and be further processed for separation into its components.

The extracted starting materials swell in the aqueous suspension in which they are transferred for reducing their alcohol. Here, a swelling showing an increase in volume by a factor of 1.4 to 2 indicates a success of the new method, i.e. an only low denaturation of the proteins by means the employed alcohol.

Generally, swelling of the particles in the starting substance can also be initiated by the addition of water at the beginning of the new method. However, only subsequently increasing of the alcohol content for the extraction requires more efforts and is thus, as a rule, not preferred.

The starting substance reduced in alcohol content can directly be dried and be used as a de-oiled high protein containing flour.

Here, it is preferred, if the starting substance reduced in alcohol is neutralized and homogenized in an aqueous suspension prior to being dried. Neutralization takes place starting in the acid range, if no alkaline renaturation of the proteins takes place, or it takes place out of the alkaline range when such an alkaline renaturation of the proteins is intended.

For obtaining protein isolates the starting substance reduced in alcohol content can be alkaline extracted, an alkaline liquid phase being removed from the remaining solids, and the alkaline liquid phase being processed to obtain the protein fraction. On the other hand, the remaining solids may be processed to obtain a fiber fraction. This fiber faction may, for example, be used as roughage in the field of foodstuffs. It may be useful for the organoleptic properties of this roughage to shell a seed which forms the vegetable starting substance of the new method prior to grind it to flour. Otherwise, such a shelling is no necessary step of the new method as shells also grinded to the flour do not affect the success of any method step.

EMBODIMENT EXAMPLES

In the following the invention is further explained and described by means of embodiment examples.

Processing of Lupine Seed 100 kg of shelled lupine seed are ground down to 80 to 150 μm, to which 200 kg isopropanol are added while stirring, resulting in a solid matter concentration of 30%. This suspension is heated up to 55° C. After 10 min. of stirring the suspension is transferred into a filter press. After the chambers are filled, washing takes place with further isopropanol of 55° C. Then a dry matter content of at least 60% is adjusted by increasing the filtration pressure. The total amount of isopropanol for rewashing is to be selected in such a way that after increasing the filtration pressure 200 kg isopropanol are available for taking up new flour. I.e. the extract arising from the washing is used for taking up new flour. In contrast, prior to washing the extract is subjected to a rectification for separating the isopropanol from the extracted oils.

After achieving the desired dry matter content of about 60%, the remainder from the filter press is transferred into a receiver containing water and adjusted by means of acid to pH 4.5 while stirring. This is the isoelectric point of the proteins contained in the lupine seed. The solid content of the aqueous suspension is adjusted to 15%. For removing the soluble sugars still contained in the alcohol-extracted starting substance, this suspension is centrifuged while keeping the pH at 4.5. This process is repeated until the alcohol content of the remainder of the centrifugation step is dropped below 1%. In this way the following data are achieved with regard to the dry matter: oil content less than 1%; protein content higher than 70%; soluble carbon hydrates less than 1%; mineral matter less than 2%; alkaloids less than 20 ppm. The consumption of isopropanol prior to its rectification is about 2 kg per 1 kg shelled seed.

For producing a lupine protein concentrate the pH of the suspension of the extracted starting substance is increased up to 7.5, after the alcohol-extraction, and after lowering the alcohol content. Then a homogenizing step takes place over a pressure difference of 100 bars in a high pressure disintegrator. Here, the pH decreases by up to 1 pH-unit. The thus homogenized de-oiled starting substance is dried by spray drying. This material shows a higher water binding and an enhanced emulgating activity as compared to known alcohol-extracted substances. The known own taste of lupine is not recognizable. Instead, the product of the method has a neutral taste.

For obtaining lupine protein isolate instead of lupine protein concentrate, the pH of the homogenized suspension is adjusted to 9 be means of adding lye instead of spray drying, and in the following the proteins are dissolved by means of alkali. The dissolved proteins are separated from the solid fraction and precipitated and dried according to a known method. The solid fraction can be processed into roughage for the foodstuff field. The alkaline extraction of the proteins can also take place in a known way in a counter-current method and/or using proteases.

Processing of Soy Beans 100 kg soy-beans are directly ground down to 50 μm to 80 μm without removing the shell portions, and taken up with 260 kg isopropanol (25% dry matter). This suspension is heated up to 55° C. After 15 min. of stirring, the suspension is directed to a decanter centrifuge and centrifuged at 3.500×g. The solid matter output has a solid matter content of about 40% and is taken up in fresh isopropanol in such a way that a solid concentration of 20% results. After heating up to 55° C., it is centrifuged again at 3.500×g. This process is further repeated twice, the dry matter output increasing from 40 to about 45%. Here, the isopropanol is guided in a counter-current with regard to the solids. The extract from the first centrifugation step is transferred to a rectification. Fresh isopropanol is added prior to the fourth centrifugation step. The overflow of the second centrifugation step is added to new flour to provide the suspension prior to the first centrifugation step. After the fourth centrifugation, the output solids are transferred into a receiver containing water and adjusted to pH 4.5 by means of acid while stirring. The solid content of the aqueous suspension is adjusted to 15% here. For removing the still contained soluble sugars, this suspension is centrifuged while keeping the pH-value at 4.5. This process is repeated until the alcohol content is below 1%. The following average data refer to the dry matter of the suspension which may be obtained in this way: oil content less than 1%; protein content higher than 70%; soluble carbon hydrates less than 1%; mineral matter less than 2%; alkaloids less than 20 ppm. The consumption of isopropanol in this method example prior to its rectification is 4 kg per 1 kg unshelled soy beans. The further processing of the suspension which has been reduced in its relative alcohol content may take place analogously as in the preceding examples.

The invention claimed is:

1. A method of obtaining an oil fraction and a protein fraction from a vegetable starting substance, comprising the steps:
   extracting the starting substance which has been reduced in size with alcohol, and separating an alcohol liquid phase from the extracted starting substance;
   distilling the alcohol from the alcohol liquid phase to obtain an oil fraction without drying the alcohol wet extracted starting substance directly after the alcohol-extraction;
   preparing an aqueous suspension by suspending the still alcohol wet extracted starting substance in water to reduce the alcohol content of the extracted starting substance below 5%; and
   subjecting the aqueous suspension to an alkaline extraction to obtain the protein fraction.

2. The method of claim 1, wherein the starting substance is reduced in size to flour having particle sizes in the range of 10 to 250 μm.

3. The method according to claim 1, wherein the starting substance is alcohol-extracted with isopropanol.

4. The method according to claim 1, wherein the starting substance is alcohol-extracted at 40 to 70° C.

5. The method according to claim 1, wherein the alcohol content during the extraction is at least 60%.

6. The method according to claim 2, wherein the extracted starting substance is washed with water, until its alcohol content is less than 2%.

7. The method according to claim 1, wherein the pH in reducing the alcohol content of the extracted starting substance with water is at the isoelectric point of the protein fraction.

8. The method according to claim 1, wherein the starting substance which has been reduced in its alcohol content is treated with alkali.

9. The method according to claim 8, wherein the alkali treatment takes place at a pH in the range of 9 to 10 and under homogenization of the starting substance.

10. The method according to claim 1, wherein the starting substance which has been reduced in its alcohol content is dried.

11. The method according to claim 10, wherein the starting substance which has been reduced in its alcohol content is neutralized and homogenized in an aqueous suspension prior to being dried.

12. The method according to claim 1, wherein the starting substance which has been reduced in its alcohol content is extracted with alkali, an alkaline liquid phase being separated from the remaining solids, and the alkaline liquid phase being processed to obtain the protein fraction.

13. The method according to claim 12, wherein the remaining solids are processed to obtain a fiber fraction.

14. The method of claim 2, wherein the starting substance is reduced in size to flour having particle sizes in the range of 50 to 150 μm.

15. The method of claim 4, wherein the starting substance is alcohol-extracted at 50 to 60° C.

16. The method of claim 5, wherein the alcohol content during the extraction is at least 80%.

17. The method of claim 6, wherein the extracted starting substance is washed with water until its alcohol content is less than 1%.

18. The method of claim 7, wherein the pH in reducing the alcohol content of the extracted starting substance with water is between 4 and 5.

* * * * *